United States Patent [19]

Kausch et al.

[11] Patent Number: 4,772,677

[45] Date of Patent: Sep. 20, 1988

[54] HIGHLY STRETCHABLE ELASTHANE FIBRES WITH IMPROVED PROPERTIES

[75] Inventors: Michael Kausch, Cologne; Carlhans Süling, Odenthal; Hans Schröer, Dormagen; Karlheinz Wolf, Cologne; Rudi Dauscher, Dormagen, all of Fed. Rep. of Germany

[73] Assignee: Bayer Aktiengesellschaft, Leverkusen, Fed. Rep. of Germany

[21] Appl. No.: 124,509

[22] Filed: Nov. 23, 1987

[30] Foreign Application Priority Data

Dec. 6, 1986 [DE] Fed. Rep. of Germany ....... 3641703

[51] Int. Cl.$^4$ .............................................. C08G 18/32
[52] U.S. Cl. ...................................... 528/61; 528/67; 528/76
[58] Field of Search .............................. 528/61, 67, 76

[56] References Cited

U.S. PATENT DOCUMENTS 4,481,127 11/1984 Yeater ................................... 528/76

Primary Examiner—Maurice J. Welsh
Attorney, Agent, or Firm—Connolly and Hutz

[57] ABSTRACT

This invention relates to highly stretchable elasthane fibres (Spandex fibres) based on segmented polyurethane(urea)s with improved elastic properties and high resistance to microbial degradation, characterized in that the polyurethane(urea)s used for the synthesis of the elasthanes are prepared from mixtures of relatively high molecular weight copolyester diols in the molecular weight range of from 2,500 to 4,000 and relatively high molecular polytetrahydrofurandiols in the molecular weight range of from 1,500 to 3,000.

12 Claims, No Drawings

HIGHLY STRETCHABLE ELASTHANE FIBRES WITH IMPROVED PROPERTIES

This invention relates to highly stretchable elasthane fibres (Spandex fibres) based on segmented polyurethane(urea)s with improved elastic properties and high resistance to microbial degradation, characterised in that the polyurethane(urea)s used for the synthesis of the elasthanes are prepared from mixtures of relatively high molecular weight copolyesterdiols in the molecular weight range of from 2500 to 4000 and relatively high molecular weight polytetrahydrofurandiols in the molecular weight range of from 1500 to 3000.

Elasthane fibres are fibres containing at least 85% by weight of segmented polyurethane(urea)s. Such elasthane fibres are conventionally prepared by first masking a long chained diol (macrodiol) with a terminal diisocyanate to produce a macrodiisocyanate (isocyanate prepolymer) which is then reacted in a second stage of the process with a chain lengthening agent normally consisting of a diamine to produce a high molecular weight polyurethaneurea. The macromolecule of these polyurethaneureas has a segmental structure, i.e. it consists of crystalline and amorphous blocks (hard segments and soft segments). Owing to their crystallinity, the hard segments function as fixed points of the network and therefore determine the strength of the moulded products produced from the polymers while the soft segments, whose glass temperature must lie below the use temperature, determine the elasticity of the elastomers. Polyesterdiols or polyetherdiols are normally used for synthesizing the soft segments of commercial elasthane threads or fibres. The molecular weights of these polyester or polyether diols are generally of the order of 2000 and may be used for the production of fibres capable of stretching by 360 to 500%.

For special purposes where exceptionally high degrees of stretchability are required, macrodiols with higher molecular weights, up to about 4000, are used. Polyesterdiols are particularly suitable for these purposes as they impart more highly elastic properties to the fibres compared with polyether diols of a corresponding molecular weight. A further advantage of polyester diols is that while having high molecular weights and very satisfactory functionality, they are simpler to prepare than the corresponding polyetherdiols and therefore enable a less expensive thanelast fibre to be produced. One disadvantage of all elastomers prepared from polyesters, however, is their sensitivity to degradation by microbes or mould fungi. Polyesters containing adipic acid as acid component are the most suitable for the preparation of elasthanes. The diol components used are most suitably in the form of mixtures of diols in order to prevent crystallisation on elongation and hence obtain excellent elastic properties. The most suitable results, also as regards resistance to hydrolysis, are obtained with diol mixtures composed of relatively long chained diols with more than 4 carbon atoms, e.g. hexane-1,6-diol, butane-1,4-diol, neopentyl glycol, etc.

Processes in which soft segments of mixtures of polyester and polyetherdiols are used with a view to improving the low temperature characteristics of thanelast fibres have been described (e.g. GB-PS No. 1 035 254, BE-PS No. 633 255 or DE-A-No. 1 495 035). The fibres produced by these processes, however, have insufficient strength for the present day requirements demanded of a serviceable thanelast.

Another, more recent Application (JA No. 59-179 513) describes the preparation of elasthane spinning solutions containing soft segments of blocked polyester polyethers. In the said Application, it is explicitly pointed out that the polyester-ether mixtures mentioned there will only give rise to clear spinning solutions not clouded by microphase separation if the soft segments are synthesized in the form of polyester and polyether blocks by a special prepolymer process not conventionally used for elasthane production.

Spinning solutions are normally required to be clear and unclouded by microphase separation so that no phase separation will occur during storage of the solutions and a satisfactory spinning process may subsequently be carried out.

It has now surprisingly been found that homogeneous elasthane spinning solutions not clouded by microphase separation may be prepared by a simple process from mixtures of polyester and polyetherdiols if the polyesterdiols used are copolyesters of adipic acid and mixtures of 2 to 4 different, preferably relatively long chained diols ($\geq C_4$), which copolyesters have molecular weights of from 2500 to 4000, and the polyether component used consists of polytetrahydrofurandiols in the molecular weight range of from 1500 to 2500. It was also surprising to find that thanelast fibres having a resistance to microbes equal to that of pure polyether thanelast fibres may be obtained with polyether contents below 40% by weight. It was equally surprising to find that this addition of comparatively low molecular weight polytetrahydrofuran diols (compared to the molecular weights of the polyesters) does not result in any loss of the elastic properties required of highly stretchable elasthanes.

The present invention relates to elasthane fibres and threads produced from segmented polyuretane(urea)s in which the soft segments consist of a mixture of polyesterdiols and polyetherdiols in a ratio by weight of from 8.5:1.5 to 5:5, preferably from 7.5:2.5 to 6:4, and the polyesterdiol consists of a copolyester of adipic acid and a mixture of 2 to 4 different, preferably relatively long chained ($\geq C_4$) diols and has molecular weights in the range of from 2500 to 4000, preferably from 2700 to 3500, the polyether diol consisting of a polytetrahydrofurandiol (polyoxytetramethylenediol) with molecular weights in the range of from 1500 to 3000, preferably from 1700 to 2500.

The method according to this invention enables elasthane fibres having the excellent properties of a typical polyester long stretch thanelast combined with the high resistance to microbes of a pure polyether thanelast to be produced with a minimum of polyetherdiol which moreover is a relatively inexpensive polyetherdiol with a molecular weight in the region of 2000.

Particularly suitable alcohol components for the preparation of the polyesterdiols used include hexane-1,6-diol, butane-1,4-diol and neopentyl glycol (2,2-dimethylpropane-1,3-diol). A proportion of $\epsilon$-caprolactone may be included to replace a diol. The melting points of the polyesters should preferably be below 50° C., especially below 45° C.

The polyurethaneureas according to this invention are prepared by known processes. Particularly suitable is the synthetic preparation of the fibre raw materials by the prepolymer process in which polyesterdiols and polyetherdiols are first mixed together and then reacted with a diisocyanate, either solvent-free or in a solvent, to produce a prepolymer containing isocyanate end groups. The OH/NCO ratio is preferably from 1:1.7 to 1:2.5, most preferably from 1:1.80 to 1:2.25, the ratios being chosen according to the molecular weight of the higher molecular weight diols to result in isocyanate contents (calculated from the solids content of the isocyanate prepolymer) of preferably from 1.7 to 3.0% NCO, most preferably from 1.8 to 2.6% NCO. Particularly suitable solvents optionally used for the prepolymerisation include chlorobenzene, N-methylpyrrolidone, dimethylsulphoxide and especially dimethylformamide and dimethylacetamide.

Short chained diols containing tertiary amino groups may be incorporated by condensation with the mixtures of polyester and polyetherdiols.

The conventional aromatic diisocyanates are used for the synthesis of the elasthane according to the invention, optionally as mixtures with small proportions of aliphatic diisocyanates. Particularly useful results are obtained with the following diisocyanates: 2,4-Tolylene diisocyanate and isomeric mixtures thereof, but especially 4,4'-diphenylmethane-diisocyanate and corresponding isomeric mixtures thereof together with minor quantities of 2,4'- and/or 2,2'-isomers.

Mixtures of aromatic diisocyanates may, of course, also be used. In addition, the following (cyclo)aliphatic diisocyanates, for example, may be included as components of the mixture: Hexamethylenediisocyanate, isophorone diisocyanate, dicyclohexylmethane diisocyanate and trans-1,4-cyclohexanediisocyanate.

In another, particularly advantageous embodiment of the process of synthesizing the elasthane raw materials according to this invention, polyester and polyether polyurethane prepolymers are mixed together and then reacted in known manner to form polyurea polyurethanes.

In the process of formation of the polyurea polyurethanes, the required urea groups are introduced into the macromolecules by a chain lengthening reaction. The macrodiisocyanates synthesized at the prepolymer stage are normally reacted in solution with diamines such as ethylenediamine propylene-1,3-diamine, tetramethylene diamine, cyclohexane-1,3-diamine or isophoronediamine or mixtures of these diamines, in particular mixtures containing ethylenediamine as the main component.

The solvents are suitably polar solvents, e.g. dimethylsulphoxide, N-methyl-pyrrolidone and, preferably, dimethylformamide or dimethylacetamide.

The moleular weight may be adjusted to the required value by means of a small quantity of monoamines such as diethylamine or dibutylamine during the chain lengthening reaction.

Chain lengthening itself may be carried out in the presence of $CO_2$ as retarding agent.

When polyester polyurethaneureas and polyetherpolyurethaneureas are mixed together after synthesis of the thanelast, the spinning solutions obtained when the special combination of esters and ethers is used are cloudy, so that this process is less suitable.

Numerous additives may be added for various purposes to the thanelast spinning solutions according to this invention, e.g. antioxidants, light protective agents, dyes to improve the aesthetic effect, pigments, colouring additives, antistatic agents and additives which act as non-stick agents, such as magnesium, calcium, lithium, zinc and/or aluminium stearates, etc.

The solutions may be spun by the wet spinning or, preferably, the dry spinning process.

EXAMPLE 1

(A) 100 kg of a Polyester containing hydroxyl end groups and having an OH number of 34.66 (molecular weight 3231) was prepared by the reaction of 54.96 kg of adipic. acid, 30.47 kg of hexane-1,6-diol and 14.57 kg of neopentyl glycol.

(B) 12.936 kg of the polyester according to (A) were mixed with 5.544 kg of a polytetramethylene oxide diol having an OH number of 55.9 (molecular weight 2000, Terathane-2000 of Du Pont, Wilmington, USA) and 12.233 kg of dimethylacetamide, and 3.221 kg of diphenylmethane-4,4'-diisocyanate were added thereto. The reaction mixture was then heated to 50°–54° C. with stirring for 100 minutes, till the isocyanate content of the prepolymer was 2.22%.

A mixture of 327.6 g of ethylenediamine and 8.4 g of diethylamine in 61.44 kg of dimethylacetamide was prepared and 720 g of $CO_2$ were added thereto. 30.84 kg of the prepolymer solution were added to this carbamate suspension with vigorous stirring in the course of 15 minutes. A homogeneous, clear elastomer solution having a solids content of 22% by weight, a solution viscosity of 78 Pa.s/25° C. and an inherent viscosity of 1.31 dl/g (5 g/l dimethylacetamide at 30° C.) was obtained. 2% by weight of titanium dioxide (Rutile KB-3, BAYER AG), 0.3% by weight of Mg stearate, 1% by weight of Cyanox ® 1790 and 1% of the silicone oil Baysilon ® M 100 (BAYER-AG, D-5090 Leverkusen) and 5% of a colouring additive prepared by the reaction of N-methyl-diisopropylamine with dicyclohexylmethane diisocyanate in proportions of 1:0.99 were added to the viscous polymer solution, the percentages given being based on the PU solids content. If the Baysilon M 100 in the spinning solution described above is replaced by 0.5% by weight of the polyether siloxane Silwet ® L 7607 of Union Carbide Corporation, USA, the quantity of Mg stearate added is increased to 0.5% and 4% by weight of the colouring additive described above is added, the textile properties of the fibres obtained are virtually the same as those of Example 1 but in addition the antistatic properties and spinning qualities are somewhat improved and good dripping properties are obtained.

EXAMPLE 2 (COMPARISON EXAMPLE FOR COMPARISON TO EXAMPLE 1—POLYESTER BASIS)

18.0 kg of the Polyester of Example 1A) were mixed with 11918 kg of dimethylacetamide, and 3188 kg of dihenylmethane-4,4'-diisocyanate were added. The reaction mixture was then heated to 50°–55° C. with stirring for about 90 minutes, i.e. until the isocyanate content of the prepolymer was 2.49%.

A mixture of 369.5 g of ethylenediamine and 18.6 g of diethylamine in 54,578 kg of dimethylacetamide was prepared and 800 g of $CO_2$ were added. 33.1 kg of the prepolymer solution were added to this carbamate suspension within 15 minutes.

A homogeneous, clear elastomer solution having a solids content of 22%, a solution viscosity of 67 Pa.s and inherent viscosity of 1.20 dl/g (5 g/l dimethylacetamide at 30°) was obtained. The same additives as those used in Example 1 were added to this viscous solution.

EXAMPLE 3 (COMPARISON EXAMPLE TO 1—POLYETHER BASIS)

11,843 kg of Dimethylacetamide were mixed with 18.0 kg of a polytetramethylene oxide diol having an OH number of 39.0 (molecular weight 2872 - Terathane ® 2900 Du Pont, Wilmington, Del., USA), and 3055 kg of diphenylmethane-4,4'-diisocyanate were added.

The reaction mixture was then heated to 50° C. for about 100 minutes with stirring until the isocyanate content of the prepolymer was 2.17%.

A mixture of 306.6 g of ethylenediamine and 39.2 g of diethylamine in 60.6 kg of dimethylacetamide was prepared and 700 g of $CO_2$ were added. 30.4 kg of the prepolymer solution were added to this carbamate suspension within 15 minutes with vigorous stirring. A homogeneous, clear elastomer solution having a solids content of 22%, a solution viscosity of 72 Pa.s/25° C. and an inherent viscosity of 1.15 dl/g (5 g/l dimethylacetamide at 30° C.) was obtained. The same additives as mentioned in Example 1 were added to this viscous solution.

Solutions 1–3 were spun by the dry spinning process through a 12 aperture die with apertures 0.2 mm in diameter, employing a heating temperature for the shaft of 210° C., an air temperature of 230° C. and a draw-off rate of 400 m/min. The individual filaments for each group of die apertures were combined to form a quasimonofilament underneath the end of the shaft by means of a jet twister in the usual manner. The fibres were then dressed with a mixture of 80 parts of Baysilon ® M 100 and 20 parts of Baysilon ® M 10.

A comparison of important textile data is given in Table 1.

TABLE 1

Comparison of the elastic and mechanical properties tested on the fibres of Examples 1–3

| | Fibres according to | | |
|---|---|---|---|
| Substrate<br>Molecular weight | Example 1<br>Polyester/<br>polyether<br>3231/2000 | Example 2<br>(Comparison)<br>Polyester<br>3231 | Example 3<br>(Comparison)<br>Polyether<br>2872 |
| Titre [dtex] | 158 | 152 | 153 |
| Maximum power pull elongation [%] (DIN 3 815) | 528 | 516 | 584 |
| Fineness strength [cN/tex] (DIN 53 815) | 9.41 | 10.2 | 11.5 |
| Residual elongation* [%] | 14.3 | 10.2 | 17.0 |
| Fatigue ratio B1* | 0.87 | 0.79 | 0.71 |
| Hysteresis ratio B6* | 0.35 | 0.34 | 0.28 |

*Methods of measurement: See Product information, Bayer-Textilfaser Dorlastan[R], Properties and Applications BAYER AG, Department fibres, Sales and Distribution, D-5090 Leverkusen, Stand 1983.

The fatigue ratio B1 is the force ratio of the 5th application of load at 300% elongation to the 1st application of load at 300% elongation in an elongation pendulum experiment.

The hysteresis ratio B6 is the force ratio between the 5th release of load at 50% elongation and the 1st application of load at 50% elongation in an elongation pendulum experiment.

Table 1 clearly shows the superior elastic properties (fatigue ratio and hysteresis ratio) of the fibres according to Example 1, especially by comparison with the polyether thanelast fibres of Example 3.

EXAMPLE 4

(A) 100 kg of a Polyester containing hydroxyl end groups and having an OH number of 34.08 (molecular weight 3286) was prepared by the conventional method of thermal esterification, using 55.38 kg of adipic acid, 30.78 kg of hexane-1,6-diol, 6.42 kg of butane-1,4-diol and 7.42 kg of neopentyl glycol.

(B) 12.936 kg of the polyester according to 4-A were mixed with 5.544 kg of a polytetramethylene oxide diol having an OH number of 55.9 (molecular weight 2000=Terathane ® 2000, Du Pont, Wilmington, Del., USA) and 12.233 kg of dimethylacetamide, and 3.281 kg of diphenylmethane-4,4'-diisocyanate were added thereto. The reaction mixture was then heated to 47° C. for 150 minutes with stirring until the isocyanate cortent of the prepolymer was 2.48%.

A mixture of 342.97 g of ethylenediamine and 17.03 g of diethylamine in 62.44 kg of dimethylacetamide was prepared and 720 g of $CO_2$ were added thereto. 31.36 kg of the isocyanate prepolymer solution were added to this freshly formed carbamate suspension within 15 minutes with vigorous stirring. A homogeneous, clear polymer solution having a solids content of 22%, a solution viscosity of 80.6 Pa.s/25° C. and an inherent viscosity of 1.38 dl/g (5 g/l, dimethylacetamide at 30° C.) was obtained. To this viscous polymer solution were added, in percentages based on the PU solids content, 0.1% by weight of titanium dioxide (Rutile KB-3. Bayer AG, D-5090 Leverkusen), 0.5% of Mg stearate, 0.5% of the silicone oil Silwet ® L 7607 (Union Carbide Corporation). 1% by weight of Cyanox ® 1790 (American Cyanamide, USA), 5 ppm of Makrolex ® Violet B (Bayer AG, D-5090 Leverkusen) and 4% of a colouring additive which had been prepared by the reaction of N-methyl-diisopropanolamine with 4,4'-dicyclohexylmethane diisocyanate in the ratio of 1:0.99.

Spinning of the solution was carried out by the dry spinning process through a 12-aperture die having apertures 0.3 mm in diameter, a shaft heating temperature of 220° C., an air temperature of 270° C. and a draw-off rate of 400 m/min, using a jet twister and with the application of about 5% by weight of a silicone oil mixture mentioned for spinning in Examples 1 to 3 (for results, see Table 2).

EXAMPLE 5 (COMPARISON EXAMPLE TO EXAMPLE 4)

18.0 kg of the polyester according to Example 4A, were mixed with 11.63 kg of dimethylacetamide, and 2.67 kg of diphenylmethane-4,4'-diisocyanate were added to the resulting mixture. The mixture was then heated to 56° C. for about 85 minutes with stirring, until the isocyanate content of the prepolymer was 2.02% by weight. A mixture of 295.33 g of ethylenediamine and 14.67 g of diethylamine in 62.6 kg of dimethylacetamide was prepared and 720 g of $CO_2$ (dry ice in the form of small pieces) were added. 31.3 kg of the isocyanate prepolymer solution were added to this carbamate suspension within 15 minutes with vigorous stirring. The viscosity was then adjusted to 115 Pa.s/25° C. by the portionwise addition of a total of 15 g of hexamethylene-1,6-diisocyanate. A homogeneous, clear elastomer solution having a solids content of 22% by weight and an inherent viscosity of 1.47 dl/g (5 g/l of dimethylacetamide at 30° C.) was obtained. The same additives as those used in Example 4 were added to the viscous polymer solution. Spinning was carried out under the same conditions as described in Example 4 (for results, see Table 2).

EXAMPLE 6 (COMPARISON EXAMPLE TO 1 - SHORTER ESTER)

(A) 100 kg of a Polyester containing hydroxyl end groups and having an OH number of 41.7 (molecular weight 2686) were prepared by the reaction of 54.49 kg of adipic acid with 30.7 kg of hexane-1,6-diol and 14.81 kg of neopentyl glycol.

(B) 3.00 kg of the polyester according to 6 A were mixed with 886 g of dimethylacetamide, and 543 g of diphenyl-methane-4,4'-diisocyanate were added thereto. The reaction mixture was then heated to 52° C. for about 95 minutes with stirring until the isocyanate content of the isocyanate prepolymer was 2.19% by weight.

A mixture of 53.35 g of ethylenediamine and 2.65 g of diethylamine in 10.90 kg of dimethylacetamide was prepared and 120 g of dry ice were added. 4.06 kg of the prepolymer solution were added to this freshly formed carbamate suspension within 15 minutes with vigorous stirring. A homogeneous, clear elastomer solution havig a solids content of 22% by weight and a solution viscosity of 71 Pa.s/25° C. and an inherent viscosity of 1.28 dl/g (5 g/l of dimethylacetamide at 30° C.) was obtained. To this viscous polymer solution were added, in percentages based on the PU solids content, 0.3% by weight of Mg stearate, 0.5% by weight of the silicone oil Silwet ® L 7607, 1.0% of Cyanox ® 1790 and 0.5% of Tinuvin ® 622 (Ciba Geigy, CH, Basle).

The solution was spun in groups of 4 threads, each thread being composed of 6 individual filaments. The diameter of the die apertures was 0.3 mm, the shaft heating temperature 190° C., the air temperature 260° C. and the draw-off rate 330 m/min (for results, see Table 2).

TABLE 2

Comparison of the elastic and mechanical properties tested on the fibres of Examples 4–6

| Substrate | Fibres according to | | |
|---|---|---|---|
| | Example 4 Polyester/ Polyether | Example 5 (Comparison) Polyester | Example 6 (Comparison) |
| Molecular weight | 3286/2000 | 3286 | 2686 |
| Titre [dtex] | 167 | 140 | 50 |
| Maximum tension-force elongation [%] (DIN 53 815) | 564 | 540 | 507 |
| Fineness strength [cN/tex] (DIN 53 815) | 9.71 | 10.1 | 10.6 |
| Residual elongation* [%] | 14.9 | 12.1 | 14.3 |
| Fatigue ratio B1* | 0.90 | 0.84 | 0.78 |
| Hysteresis ratio B6* | 0.32 | 0.43 | 0.25 |

*Methods of measurement: See Product information, Bayer-Textile Fibre Dorlastan[R], Properties and Applications BAYER AG, Department Fibres, Sales and Distribution, D-5090 Leverkusen, Stand 1983.

Test For Resistance to Microbial Degradation

The fibres of Examples 1 to 3 were first worked up into a fabric together with the polyamide and then subjected to blank dyeing and the fabric was buried in pre-conditioned garden compost for 14 days. The material was then removed and the thanelast fibres were separated out and the maximum tensile force remaining in the fibres was determined. The following results were obtained:

TABLE 3

| | Reduction in maximum tensile force (%) |
|---|---|
| Fibres of Example 1 (according to the invention) | 16.9% |
| Fibres of Example 2 (Comparison) | destroyed |
| Fibres of Example 3 (Comparison) | 1.6% |
| Fibres of Example 4 (according to the invention) | 10.4% |
| Fibres of Example 5 (Comparison) | destroyed |
| Fibres of Example 6 (Comparison) | destroyed |

We claim:

1. An elasthane fibre or thread which comprises a segmented polyurethane-(urea) containing soft segments of mixtures of polyesterdiols and polyoxytetramethyoenediols in a ratio, by weight, of from 85:15 to 50:50, the polyester diol comprising a copolyester of adipic acid and a mixture of from 2 to 4 different diols having at least 4 carbon atoms and having a molecular weight of from 2500 to 4000, and the polyoxytetramethylenediol having a molecular weight of from 1,500 to 3,000.

2. A fibre or thread as claimed in claim 1 wherein the weight ratio of polyesterdiol:polyoxytetramethylenediol is from 75:25 to 60:40.

3. A fibre or thread as claimed in claim 1 wherein the molecular weight of the polyesterdiol is from 2,700 to 3,500.

4. A fibre or thread as claimed in claim 1 wherein the molecular weight of the polyoxytetramethylenediol is from 1,700 to 2,500.

5. A process for the production of a fibre or thread as claimed in claim 1 which comprises spinning the segmented polyurethane.

6. A process as claimed in claim 5 wherein the said mixture of the said polyesterdiol and the said polyoxytetramethylenediol is reacted with a diisocyanate to form an isocyanate prepolymer, and the prepolymer is reacted in a solvent with a diamine to be converted into a highly viscous, spinnable solution which is then spun by the dry or wet spinning process.

7. A process as claimed in claim 5 wherein the said polyester diol and the said polyoxtetramethylene diol are reacted separately to convert them into isocyanate prepolymers, and the prepolymers are then mixed together.

8. A fibre or thread as claimed in claim 2 wherein the molecular weight of the polyesterdiol is from 2,700 to 3,500.

9. A fiber or thread as claimed in claim 8 wherein the molecular weight of the polyoxytetramethylenediol is from 1,700 to 2,500.

10. A fiber or thread as claimed in claim 2 wherein the molecular weight of the polyoxytetramethylenediol is form 1,700 to 2,500.

11. A fiber or thread as claimed in claim 3 wherein the molecular weight of the polyoxytetramethylenediol is from 1,700 to 2,500.

12. A process as claimed in claim 6 wherein the said polyesterdiol and the said polyoxytetramethylenediol are reacted separately to convert them into isocyanate prepolymers, and the prepolymers and then mixed together.

* * * * *